Patented Apr. 1, 1952

2,591,239

UNITED STATES PATENT OFFICE 2,591,239

3-METHOXY-4-METHOXYMETHYL TETRAHYDROPYRAN

Otis C. Dermer and John J. Hawkins, Stillwater, Okla., assignors to Cities Service Research and Development Company, New York, N. Y., a corporation of New Jersey No Drawing. Application October 5, 1949, Serial No. 119,762

5 Claims. (Cl. 260—333)

This invention relates to novel organic compounds and more particularly to certain reaction products of butadiene and methylal.

We have discovered that a number of novel organic compounds may be prepared by reacting methylal and butadiene in the presence of sulfuric acid, among which we have identified 3,5-dimethoxy-1-pentene; 1,5-dimethoxy-2-pentene; 3-methoxy-4-methoxymethylperhydropyran; and 1,2,5-trimethoxy-3-methoxy-methylpentane. The first two of these novel compound result from the addition of one mol of methylal to one mol of butadiene; the third from the addition of one mol of methylal and one mol of formaldehyde to one mol of butadiene; and the fourth from the addition of two mols of methylal to one of butadiene.

In preparing our novel compounds, methylal and concentrated sulfuric acid are mixed, and butadiene is bubbled into the mixture under atmospheric pressure until the desired quantity has been absorbed. The sulfuric acid acts both as a catalyst and as a solvent in the reaction, and we have found that it is necessary to use at least one part of sulfuric acid to twelve parts by weight of methylal, since with lesser amounts of sulfuric acid the reaction mixture tends to split into two phases upon addition of butadiene, and the total absorption of butadiene is small. For ease in handling, and to insure rapid absorption of butadiene, we prefer to use about one part by weight of sulfuric acid to about three to four parts of methylal, although greater quantities may be used without deleterious effects upon the reaction. Use of larger quantities of acid is not economically desirable, however, since the excess acid must be neutralized prior to separation of the reaction products from the mixture, and is therefore lost.

The reaction may be carried out at any convenient temperature. Generally speaking, however, we have found that the butadiene is absorbed more readily by the solution as the temperature is lowered, and the time required to react the desired quantity of butadiene is greatly shortened. Thus in one run at 25–30° C. it was found that 75 grams of butadiene was absorbed by a solution of 600 ml. of methylal in 150 ml. of sulfuric acid in three and one-half hours; whereas in another run at 0–10° C., using the same quantities of methylal and sulfuric, 230 grams of butadiene were absorbed in two and one-half hours. Obviously, in commercial applications of our process, the cost of refrigeration would have to be balanced against the increased yields obtainable by cooling in order to determine optimum commercial conditions. For laboratory work, however, we prefer to operate at about 0–10° C.

The quantity of butadiene added to the reaction mixture has an important effect on the product distribution, although all products of reaction are present in the mixture after reaction to some extent. It has been observed that the lower-molecular-weight products, such as the dimethoxypentenes, are produced almost exclusively by increasing the amount of butadiene to approach equimolarity with the methylal. A very large excess of methylal causes a shift to the production of higher-molecular-weight products, although some of the lower ones are still produced.

After the reaction is complete, the mixture is neutralized by addition to caustic in amount equivalent to the original amount of sulfuric acid present. The neutralized material is then refluxed for a time sufficient to assure complete hydrolysis of any sulfuric esters or intermediate compounds, and is then steam-distilled to remove unreacted methylal and the lower-boiling products of reaction. It has been found desirable to remove the lower-boiling compounds by steam distillation, since ordinary distillation under atmospheric pressure will raise the temperature within the still pot to a point at which decomposition of the heavier reaction products will take place.

The steam distillate is then saturated with sodium sulfate and extracted with ether or other suitable solvent to remove the extraction products. After evaporation of the solvent, the extract may be fractionated to recover 3,5-dimethoxy-1-pentene, boiling at 136.5–137° C. at 745 mm., and 1,5-dimethoxy-2-pentene, boiling at 163.4–164° C. at 745 mm.

The residue from the steam distillation is also solvent-extracted to remove higher-boiling products of the reaction. After evaporation of the solvent, the extract may be fractionated under vacuum to recover 3-methoxy-4-methoxymethyl-perhydropyran, boiling at 98° C. at 10 mm., or 107° C. at 30 mm.; and 1,2,5-trimethoxy-3-methoxymethylpentane, boiling at 137° C. at 35 mm. or 141.5° C. at 40 mm.

An example of a method of preparation of our new butadienemethylal reaction products is as follows: 200 ml. of sulfuric acid was added slowly with mechanical stirring to 700 ml. of methylal which had previously been cooled in an ice bath. The mixture was kept in the ice bath until the sulfuric acid had been completely added. While the stirred mixture was held at 0–10° C. butadiene gas was bubbled through the mixture with a gas diffuser having good capillary porosity and a large surface. At the end of one and one-half hours it was found that 121 grams of butadiene had been absorbed. The stirring was then continued for an hour, after stopping addition of butadiene, to drive out any excess of butadiene which might have been dissolved in the reaction mixture, and the mixture was allowed to stand overnight at room temperature to achieve equilibrium.

The mixture was then neutralized by adding it to a cool solution of sodium hydroxide exactly equivalent to the original amount of sulfuric acid present, and the neutralized batch was then refluxed for about one hour to assure complete hydrolysis of any esters or other intermediate compounds. The refluxed batch was then steam-distilled and the steam distillate was taken off in the following fractions: a 40–50° C. fraction (260 ml.) essentially methylal; a 50–70° C. fraction (60 ml.) consisting mostly of methanol produced in the reaction but giving tests also for carbonyl groups and unsaturation; a 70–95° C. fraction (50 ml.) of highly unsaturated material with a seeming plateau at 92° C., which we have not identified; and finally a 95–100° C. fraction. The steam distillation was continued until a test sample of distillate yielded no separate layer when saturated with sodium sulfate.

The 95–100° C. fraction of the steam distillate was then saturated with sodium sulfate and extracted seven times with ether, yielding about 150 ml. of product when the ether was stripped off. This steam-volatile extract was then roughly distilled through an eight-ball Snyder column to effect further separation of the high-boiling material from the lower-boiling fractions. This preliminary fractionation indicated plateaus around 140° and 166° C., a single fraction of boiling-point range 130–175° C. being collected, consisting of about 110 ml. Some 20 ml. of higher-boiling product remained in the still pot, this residue being later added to the higher-boiling materials recovered from the bottoms of the steam distillation. The 130–175° C. fraction was then precisely rectified to secure pure cuts for the determination of physical constants and structural analysis, normal-butyl phthalate being used as a booster liquid in the still pot to minimize overheating because of low volume. Two cuts were isolated in this distillation, one cut boiling at 136.5–137° C. at 745 mm., the other cut boiling sharply at 163.4° C. at 745 mm. These cuts will be designated as cuts V and X, respectively, for convenience.

The non-steam-volatile material was then extracted from the neutralized bottoms of the steam distillation with ether, the solution being extracted eight times to recover as much of the higher-boiling materials as possible. This extract was then stripped of ether and vacuum-distilled rapidly to separate the materials from any decomposable material that may have been present. A fraction (125 ml.) boiling up to 250° at 40 mm. pressure was collected. At this temperature decomposition began to set in and it was deemed inadvisable to collect any further fractions. About 45 ml. of very high-boiling material was left in the distillation flask after rectification.

The 20 ml. bottoms from the rectification of the steam-volatile extract were added to the roughly distilled non-steam-volatile extract, and the mixture was fractionated in an Oldershaw column for the purification of higher cuts, normal-butyl phthalate being used as a booster to increase the recovery of desired cuts and to minimize decomposition by keeping the still pot full enough to prevent local overheating. A fraction designated as cut Y was obtained boiling at 98° C. at 10 mm. The total yield of this fraction was 40 ml. Further distillation yielded a fourth cut designated at cut Z which boiled at 137° C. at 35 mm., this being obtained in a yield of 12.2 ml. As had been pointed out before, still higher-boiling cuts in the non-steam-volatile fraction were noted in the first rough distillation of the fraction. Yields of the various designated cuts, based on butadiene, were as follows: cut V, 12 per cent; cut X, 20 per cent; cut Y, 13 per cent; and cut Z, 3 per cent.

Cut Y had an observed molecular weight of 156, corresponding closely to a theoretical molecular weight of 160 for a compound resulting from the addition of one mol of methylal and one mol of formaldehyde to one mol of butadiene. It was expected that a compound of this type might be found among the reaction products, since, as pointed out above, upon steam distillation of the neutralized reaction mixture, a quantity of methanol was taken overhead, with no formaldehyde being observed. Obviously, some methylal had been hydrolyzed to methanol and formaldehyde, the formaldehyde set free entering into some reaction with the butadiene.

Further physical characteristics confirmed the conclusion the cut Y has the empirical formula $C_8H_{16}O_3$ and the structure assigned, these characteristics being summarized in the following table.

*Table I*

|  | Experimental | Theoretical for $C_8H_{16}O_3$ |
|---|---|---|
| Molecular Wt | 156 | 160 |
| C per cent | 59.74 | 60.00 |
| H per cent | 10.27 | 10.00 |
| Molar Refraction | 41.55 | 41.88 |
| Methoxyl per cent | 38.8 | 38.7 |
| Boiling point at 30 mm., °C | 107 |  |
| Refractive Index, $n_D$ at 28° C | 1.4372 |  |
| Density at 28° C., g./ml | 1.012 |  |

Qualitative tests yielded the following results: Unsaturation: none; methoxyl: positive; carbonyl: trace positive; ester: none; ether: positive; and hydroxyl: none. All evidence is that cut Y is the hitherto-unknown 3-methoxy-4-methoxymethylperhydropyran, with the probable mechanism of formation as follows:

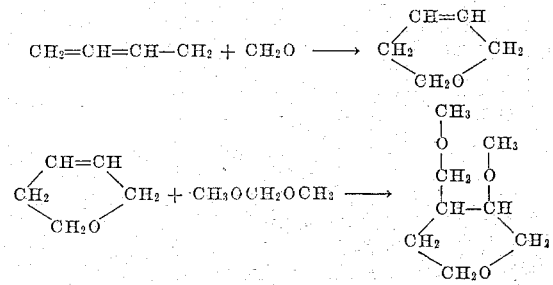

It is possible that another structure could be formed by the reverse orientation of the methylal molecule into the dihydro-1,2H-pyran intermediate. This is considered unlikely, however, since it has been noted that in a Prins-type acid-catalyzed addition, such as the present reaction, the negative-acting group is always observed to go to the olefinic carbon which has been more heavily substituted with electronegative groups. It is possible, however, that the other structure is present in the crude reaction product, but in such small volume that it has not been isolated and characterized.

While cuts V, X, and Z above have been identified as the isomeric dimethoxypentenes and 1,2,5-trimethoxy-3-methoxymethylpentane, respectively, these compounds are not claimed in this application, so that a recitation of their physical characteristics and the method of identification would appear to be surplusage. Their characteristics and identification are fully set forth in our applications Serial No. 119,761, now U. S. Patent 2,524,777, and Serial No. 119,763, now U. S. Patent 2,524,778, respectively, in which these compositions are claimed as new compositions of matter.

The four compounds which we have isolated are of a comparatively new type and offer many possibilities as plasticizers and chemical intermediates. Thus a cleavage of the methoxyl groups would yield new polyhydroxy alcohols of the types being currently used as insect repellents and insecticides. It has also been observed that our new compounds are apparently good solvents for the silicone-type greases as evidenced by troubles encountered with maintaining sufficient stopcock lubrication, especially during vacuum distillation.

Having now described our invention, what is claimed is:

1. 3-methoxy-4-methoxymethyltetrahydropyran.

2. The method of producing 3-methoxy-4-methoxymethyltetrahydropyran including dissolving methylal in concentrated sulfuric acid, reacting butadiene with the dissolved methylal, neutralizing the reaction mixture, steam-distilling the reaction mixture to remove unreacted methylal and the lighter reaction products, and recovering 3-methoxy-4-methoxymethyltetrahydropyran from the non-steam-volatile portion of the reaction products.

3. The method according to claim 2 in which sulfuric acid is present in the methylal-sulfuric acid solution in the amount of at least one part by weight of sulfuric acid to twelve parts of methylal.

4. The method according to claim 3 including extracting the non-steam-volatile portion of the reaction products with a solvent, stripping the solvent from the extract, and recovering 3-methoxy-4-methoxymethyltetrahydropyran by fractional distillation under vacuum.

5. The method according to claim 4 in which the solvent is ether.

OTIS C. DERMER.
JOHN J. HAWKINS.

REFERENCES CITED

The following references are of record in the file of this patent:

UNITED STATES PATENTS

| Number | Name | Date |
|---|---|---|
| 2,452,977 | Williams | Nov. 2, 1948 |
| 2,493,964 | Gresham | Jan. 10, 1950 |